United States Patent [19]

Ackeret

[11] Patent Number: 4,722,034
[45] Date of Patent: Jan. 26, 1988

[54] STORAGE CONTAINER FOR RECORDING MEDIA

[75] Inventor: Peter Ackeret, Kusnacht, Switzerland

[73] Assignee: IDN Inventions and Development of Novelties AG, Chur, Switzerland

[21] Appl. No.: 940,954

[22] Filed: Dec. 12, 1986

[30] Foreign Application Priority Data

Dec. 13, 1985 [DE] Fed. Rep. of Germany ....... 3544055

[51] Int. Cl.[4] ............................................. H04M 1/22
[52] U.S. Cl. ...................................... 362/86; 206/311; 206/387; 206/444; 312/12; 312/234.3; 340/815.31
[58] Field of Search .................... 362/86, 32, 26, 29, 362/30, 23, 87; 206/311, 444, 387; 340/815.12, 815.13, 815.15, 815.31; 312/10, 12, 234.3

[56] References Cited

U.S. PATENT DOCUMENTS

| | | | |
|---|---|---|---|
| 3,557,360 | 1/1971 | Aldridge | 362/86 X |
| 3,647,986 | 3/1972 | Lace et al. | 340/815.31 X |
| 4,322,780 | 3/1982 | Murakami et al. | 362/86 X |
| 4,493,417 | 1/1985 | Ackeret | 206/444 X |
| 4,592,600 | 6/1986 | Bohnet et al. | 312/12 |
| 4,625,263 | 11/1986 | Strohmeier | 362/86 X |

Primary Examiner—Lloyd L. King
Attorney, Agent, or Firm—Chilton, Alix & Van Kirk

[57] ABSTRACT

A storage container for recording media for installation in motor vehicles. A housing assembly has a plurality of holders for at least one recording medium, by which the recording media can be transported out of the housing assembly into a convenient position for removal. Each holder has a front wall for covering the storage chambers of the housing assembly. To be able to insert and remove the recording medium even in the dark without requiring prolonged attention, the housing assembly has an electrical connection to the motor vehicle's electrical system in order to supply a light source arrangement. When holders have been pushed home in the housing assembly, at least one partial area of the front wall thereof is able to be illuminated so as to be visible from the outside. Feed outlets for each holder are arranged in the housing assembly so that they are in light transmission contact with feed inlets of the holders when these have been pushed home in the housing assembly.

49 Claims, 29 Drawing Figures

STORAGE CONTAINER FOR RECORDING MEDIA

BACKGROUND OF THE INVENTION

The present invention relates to a storage container for recording media and more particularly to such containers of the type adapted for installation in motor vehicles.

Typical containers for storing media such as magnetic tape cassettes or video or audio discs, for example compact discs, include a housing assembly with a plurality of holders for at least one recording medium, by means of which the recording media can be transported out of the housing assembly into a convenient position for removal and which holders each have a front wall for covering the storage chambers of the housing assembly. When using such storage containers in motor vehicles they are also handled during travel. If, however, the driver is looking for a holder for removal or insertion of a recording medium in darkness, this may lead to dangerous situations, since the driver is possibly distracted for a prolonged period.

The problem underlying the present invention is therefore to provide a storage container of the type mentioned above, that can be used even during darkness without taking the attention of the driver for a prolonged period.

SUMMARY OF THE INVENTION

This problem is solved in accordance with the invention, by providing on the container, an electrical connection to the vehicle's electrical system, and a light source and guide arrangement, by means of which, when holders have been pushed home in the housing assembly, at least one partial area of the front wall thereof is illuminated. Light beam feed outlets for each holder are arranged in the housing assembly so that they are in transmission contact with feed inlets of the holders when these have been pushed home in the housing assembly.

It is in particular also possible to use the light supplied to each of the holders to indicate whether a holder is or is not occupied by a recording medium, so that the attention of the driver is also not distracted by searching, for example, for an empty holder to insert a recording medium that has been played.

BRIEF DESCRIPTION OF THE DRAWINGS

Additional features and advantages of the preferred embodiments of the invention are described in detail below with reference to the accompanying drawings, in which.

DESCRIPTION OF THE PREFERRED EMBODIMENTS

The storage container of the embodiment of FIGS. 1 to 10 comprises an essentially parallelepipedal housing 10 with a base 12, side walls 14, a rear wall 16 and a top wall 18, the housing shown open at the front. The housing 10 accommodates a series of holders 20 each for a recording medium 22, in the embodiment shown a so-called compact disc. The holders 20 are provided with a front wall 24, the front walls 24 of the holders 20 accommodated by the housing 10 for closing the housing at the front.

The holders 20 can individually be partially pushed out of the housing 10 by a predetermined distance, for which purpose the side walls 14 of the housing 10 have guide ribs 26 on the inside, and the holders 20 have corresponding lateral grooves 28 for engagement with the guide ribs 26. At the level of each holder 20 the side walls 14 in addition have slots 30, which extend in the direction of withdrawal of the holders 20 and into which there engage stop hooks 32 on the holders 20, which limit the withdrawal movement by each running up against the stop edge 34 of the slot 30. The stop hooks 32 are each joined, by way of resilient tongues 36 integrally formed therewith, to a receiving platter 38 of the respective holder 20, so that when the holder 20 is pushed in for the first time, the hooks 32 can spring inwards into the slot 30.

Each holder 20 has a rear edge 40 remote from the front wall 24, on which edge a leaf-type ejector spring 42 acts, of which the tongue 44 spring-biasses the holder 20 into the removal position. Here, two comb-like ejector springs 42 may be provided, the tongues 44 of which extend inwards alternately from opposite-lying sides and each acts on one holder 20. The ejector springs 42 may advantageously be introduced through an inlet opening 46 at the rear of the housing 10 through an appropriate slot and arranged between a bar 48 running parallel to the rear wall 16 and a stop 50, which is adjacent to a slot 52 in the side wall 14, so that it can spring out. A bar 54 parallel to the side wall 14, which together with this defines the inlet opening 46, serves together with a rib 56, angled behind the bar 54, to provide further fixing of the ejector spring 42, so that the latter cannot fall into the housing 10. The slot 52 extends over less than the full height of the ejector spring 42 so that the latter cannot pass through the slot 52 out of the housing 10.

On the receiving platter 38 of the holder 20 there is arranged at the front a flap 60 that is joined to the platter by way of a web-type hinge 58. The web-type hinge 58 renders possible a relative pivotal movement of the flap 60 with respect to the receiving platter 38, it being possible for the angle of movement to be limited on the one hand by the opposite-lying edges of the receiving platter 38 and of the flap 60 striking one another, and on the other hand by at least one leaf spring 62 striking against ends of corresponding receiving slots 64 therefor in the receiving platter 38 and in the flap 60. In the non hinged-down end position the flap 60 forms an extension of the receiving platter 38, in which position the entire holder 20 can be pushed into the housing 10. In the other end position—only in this position is the stop of the leaf spring 62 that biases the flap 60 into the hinged-down position effective—the flap 60 and thus its front wall 24 are hinged down to such an extent that the disc 22 can, without hindrance, be inserted into or removed from the holder 20, the receiving platter 38 being pushed so far out of the housing 10 that the portion thereof projecting beyond the front of the housing 10 forms a guide face for the insertion of the disc 22.

There may be molded on the receiving platter 38 of the holder 20, which spans the internal width of the housing 10, on the upper side thereof designed to receive a disc 22, several holding-down members 66 of which the edge facing the open front of the housing 10 is inclined and which engage over the outer circumference of an inserted disc 22. The seat of the receiving platter 38 is formed by a ring-shaped supporting face 68, recessed with respect to the upper face, for the rim of the disc 22, which continues on the flap 60 and, in order to avoid scratching, may define an approximately basin-like recess 70. In the region of the supporting face 68, the receiving platter 38 may, if desired, have resiliently displaceable tongue-like draw-in arms 72 integrally formed therewith, the free ends of which have a portion 74 that is angled upwards and flanged on the inside. The draw-in arms 72 lie with the angled portion 74 laterally against the disc 22 when this is or has been pushed into the holder 20. When the holder 20 is pushed out of the housing 10 under the action of the ejector spring 42 the disc 22 is retarded by these draw-in arms so that it is not catapulted out. Furthermore, as a result, vibrations of the disc 22, for example when using the container in a motor vehicle, are cushioned. When the disc 22 is pushed in, the draw-in arms 72 also ensure that the disc 22 passes reliably into its end position so that then also the flap 60 can be turned up. The user distinctly feels the overcoming of the checking force of the draw-in arms 72, so that he can be sure that the disc 22 is safely stowed away. The ends, bent down inwardly at right angles, of the portions 74, in this position engage over the disc 22 and ensure that the draw-in arms 72 are not able to get under the disc 22.

In order to hold the holder 20 in the inserted state in the housing 10, a locking arrangement is provided which, in the embodiment shown, in each case consists of a button 76 which is arranged in the front wall 24 and can be pushed relative to this in the plane of the receiving platter 38, the button acting on a locking slider member 78, that is, on the wedge-shaped projection 80 thereof, as a result of which its locking projection 82 can be moved out of a catch 84 in the side wall 14 against the force of a return spring 86. The return spring 86 acts on the free end of the locking slider member 78. On reinsertion, the locking projection 82 automatically falls into the catch 84. So that the buttons 76 are easier to operate, they are arranged alternately on one side and the other of the housing 10.

On the rear 16 of the housing 10 an electric light source 88, for example an electric bulb, is provided which is arranged in the center of a series of light guides 90 issuing therefrom. The light guides 90, which are present in a number corresponding to the number of holders 20 provided in the container, extend spider-like outwards from the light source 88 to the lateral regions of the rear wall 16 at the respective levels of the associated holders 20, and through the rear wall 16 into the container. There are formed integrally with the rear wall 16 connection pieces 92, which extend inwardly into the housing 10 and are of rectangular cross-section corresponding to the cross-section of the light guides 90. The light guides 90 terminate in these a little before the free end of the connection pieces 92. The connection pieces 92 are disposed adjacent to the free ends of the tongues 44 of the ejector springs 42. The holders 20 have on the underside a channel 94 extending to the front wall 24, for receiving a light guide 96 of the same cross-section as the light guide 90, which is closed by means of a cover strip 98 for the underside of the holder 20. The cover strip 98 is, for example, joined by way of snap-in connections 100 to the receiving platter 38. Adjacent to the connection piece 92, the receiving platter 38 has a recess 102 engaging partially around the connection piece 92, in which recess the light guide 96 discharges, so that in the inserted state of the holder 20 the light guide 96 projects into the connection piece 92 and lies with its end face opposite to the adjacent end face of the light guide 90, so that a light trap is formed which, in addition, prevents the emergence of stray light.

The channel 94 continues into the flap 60, the web-type joint 58 being accordingly interrupted, and terminates before the front wall 24 adjacent to the window 104 arranged in the front wall 24, which window is in turn arranged adjacent to the button 76. The channel 94 accommodates in the flap 60 also a light guide 106 of the same cross-section as the light guides 90, 96. Between the front wall end of the light guide 106 and the window 104 there is an indicating or modulating member 108 arranged, for example, in the form of a signal flag, which is disposed at one end of a pivot lever 110, which is mounted in the central region in a bearing 112 with open bearing sockets in the flap 60. The indicating member 108 may have two transparent portions of different color, or a transparent or free portion and a non-transparent portion, which, depending on whether the holder 20 is occupied or not occupied, appear before the window 104 and provide a corresponding light signal. The free end 114 of the pivot lever 110, which acts as a tang or button, projects into the supporting zone 68 of the disc 22 on the holder 20, so that by introducing a disc 22 the pivot lever 110 is pressed down and the indicating member 108 is accordingly pivoted. The return is effected by a return spring, in this case the return spring 86, which with its second free end engages between the bearing 112 and the free end 114 of the pivot lever 110 while its central portion is fixed in the flap 60.

Figure 6:
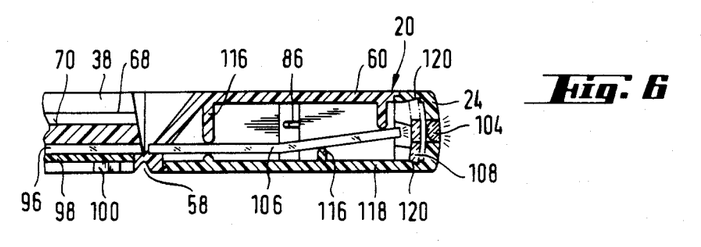
FIG. 6 shows a section along the line VI—VI of FIG. 4.
Figure 7:
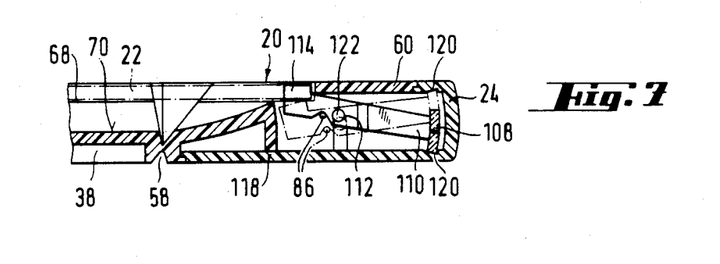
FIG. 7 shows a section along the line VII—VII of FIG. 4.
Figure 8:
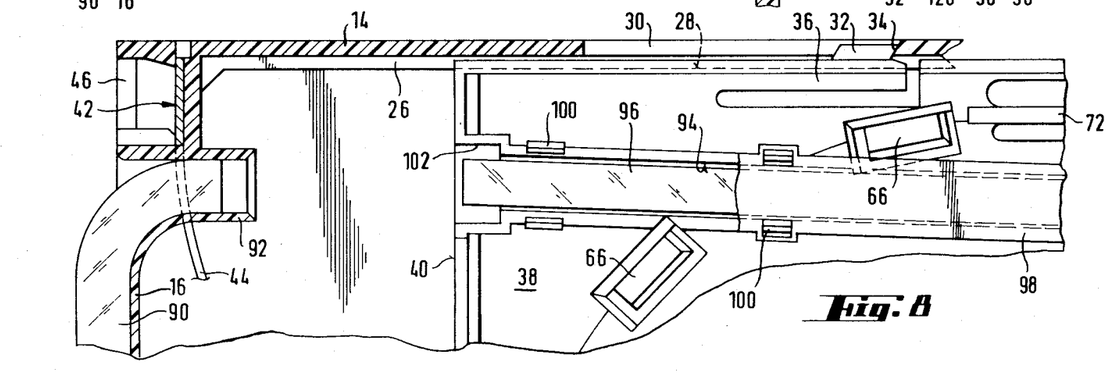
FIG. 8 shows a cut away portion corresponding to the section IV—IV with the holder inserted.

As can be seen from FIG. 6, the light guide 106 is supported in the flap 60 by ribs 116 in the flap 60 and in a cover 118, forming the front wall 24, for the flap 60. For the modulating member 108 there are arranged in the cover 118 an upper and a lower stop 120 for the two indicating positions provided. The bearing 112 is so designed that after the button 114 has been moved through half its path, the modulating member 108 has already engaged with the corresponding stop 120, as a result of which the pins 122 of the pivot arm 110 are forced out of the bearing sockets, so that the second half of the button path is tolerance zone. In the empty position, the return spring 86 holds the modulating member 108 in the bearing sockets (FIG. 7).

The cover 118 extends from the top of the flap 60 to the bottom thereof and covers the locking and light indicating means, and it is connected by snap connections 124 to the flap 60 and is centrally mounted by means of front centerings 126.

Figures 4, 5:
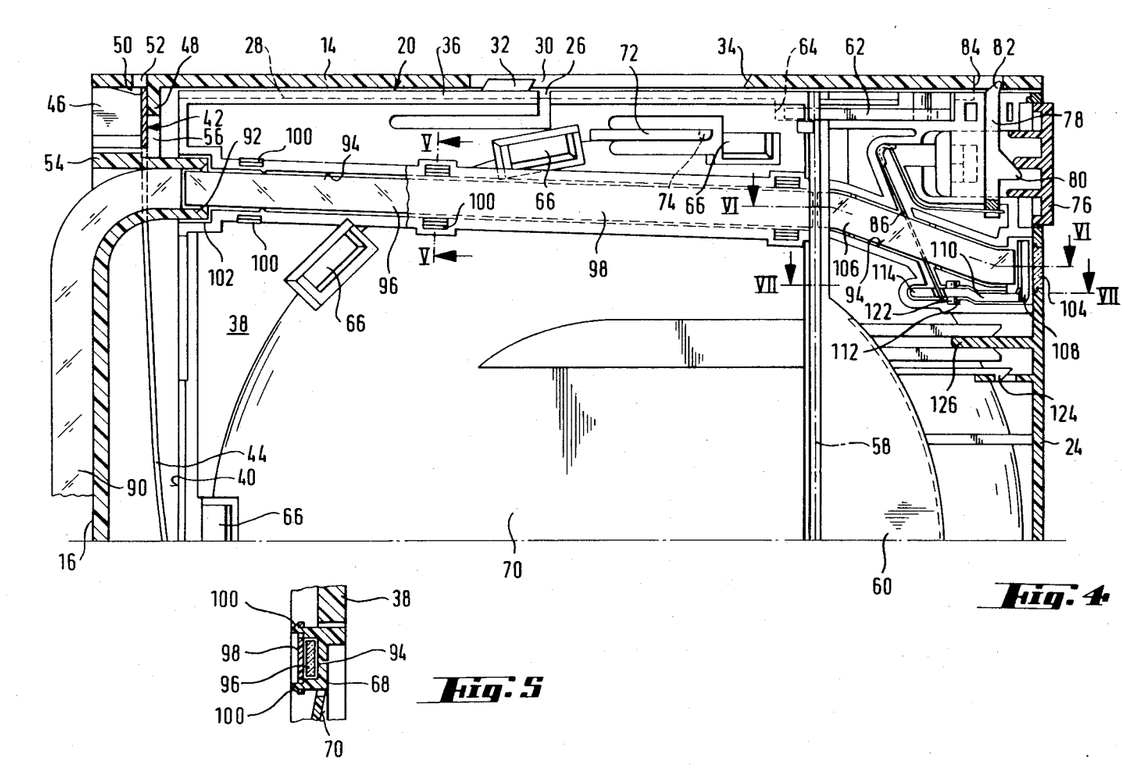
FIG. 4 shows half of a section corresponding to the line IV—IV of FIG. 3.
FIG. 5 shows a section along the line V—V of FIG. 4.

In particular, the holder 20 may be designed mirror-symmetrically to the central plane in the direction of withdrawal and perpendicular to the plane of representation of FIG. 4, so that the button 76, the locking slider member 78, the receiving platter 38, the flap 60, the window 104, the light guides 96, 106, the return spring 86 and the cover strip 98 can be used both on the right and the left hand side.

Figures 9, 10:
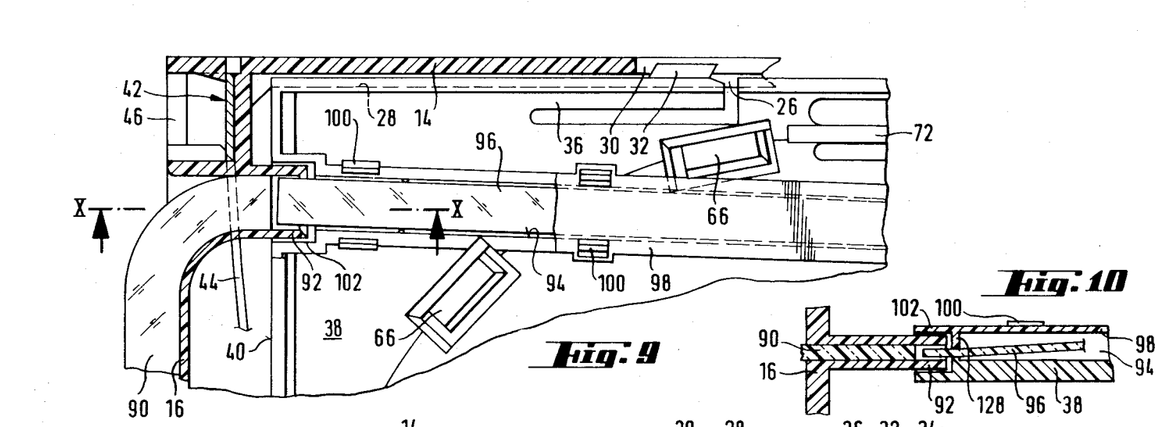
FIG. 9 shows a cut away portion corresponding to the section IV—IV with the holder pushed out.
FIG. 10 shows a section along the line X—X of FIG. 8.

As can be seen from FIG. 10, the recess 102 on the underside of the receiving platter 38 is bounded by the cover strip 98, which is provided with a bar 128 which holds the light guide 96 in the position in which it can be inserted into the connection piece 92.

Figure 1:
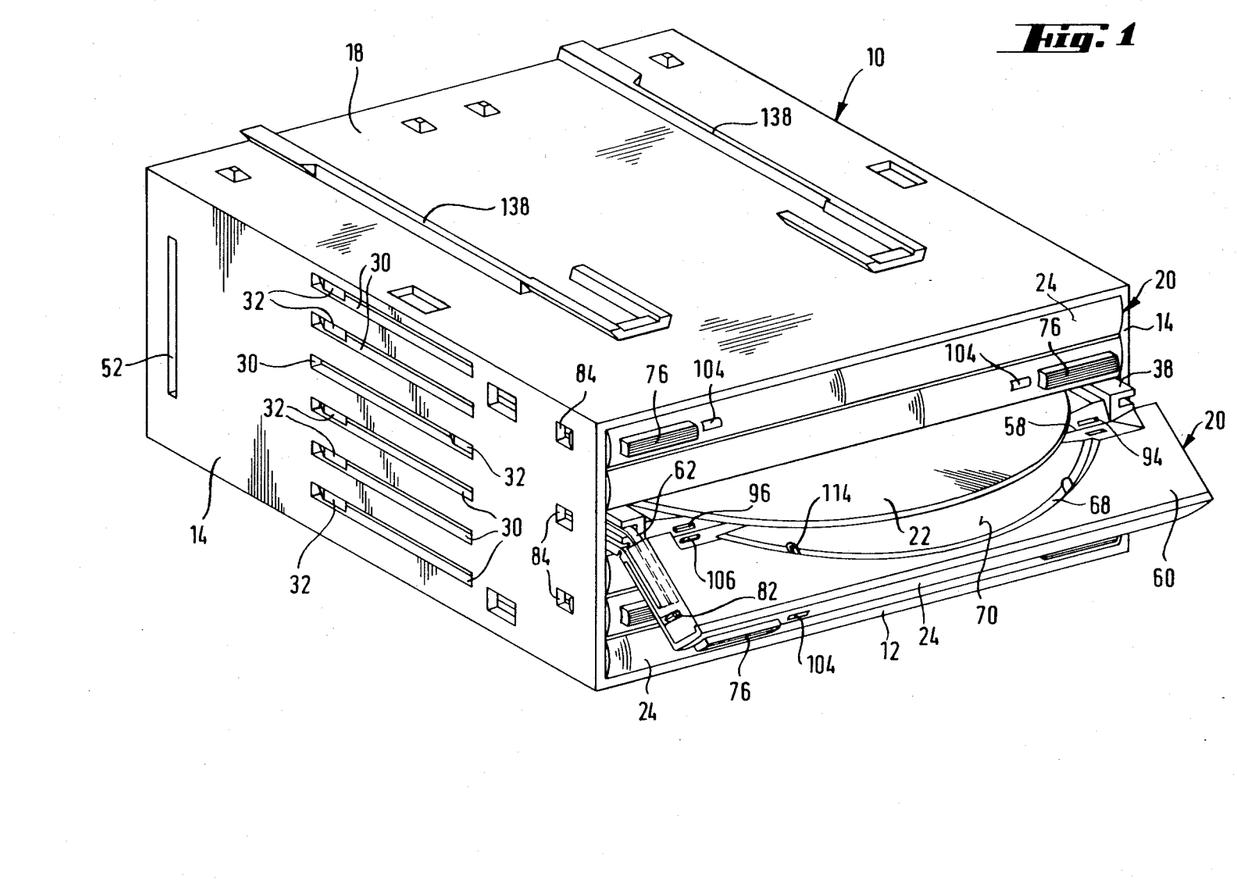
FIG. 1 shows a perspective view of a storage container for discs.
Figure 2:
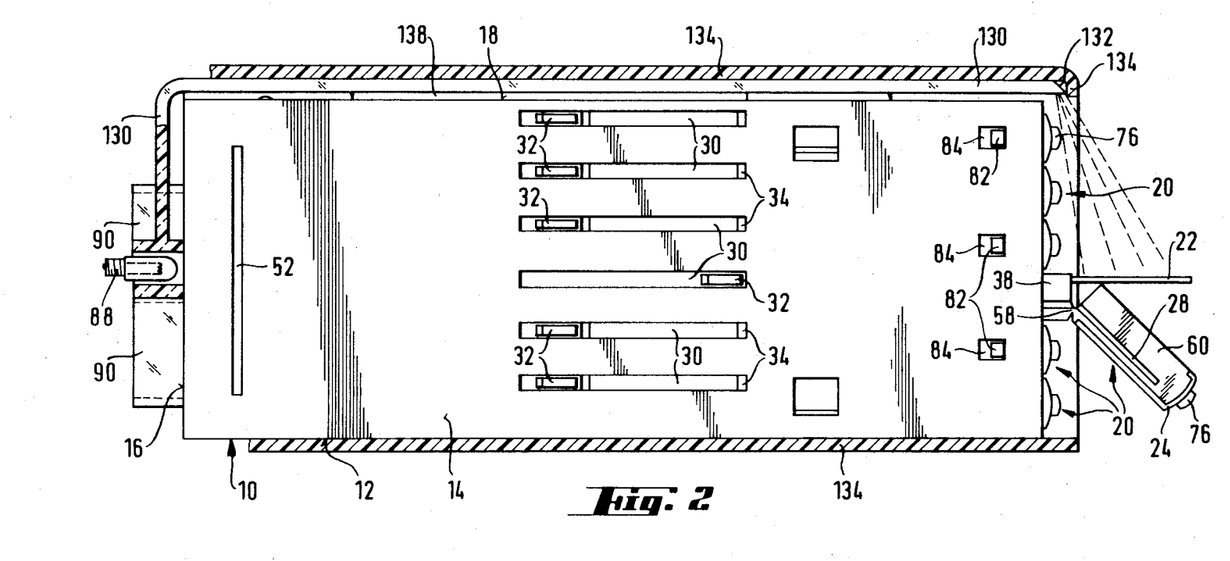
FIG. 2 shows, in part schematically, a side view of a storage container for discs.
Figure 3:
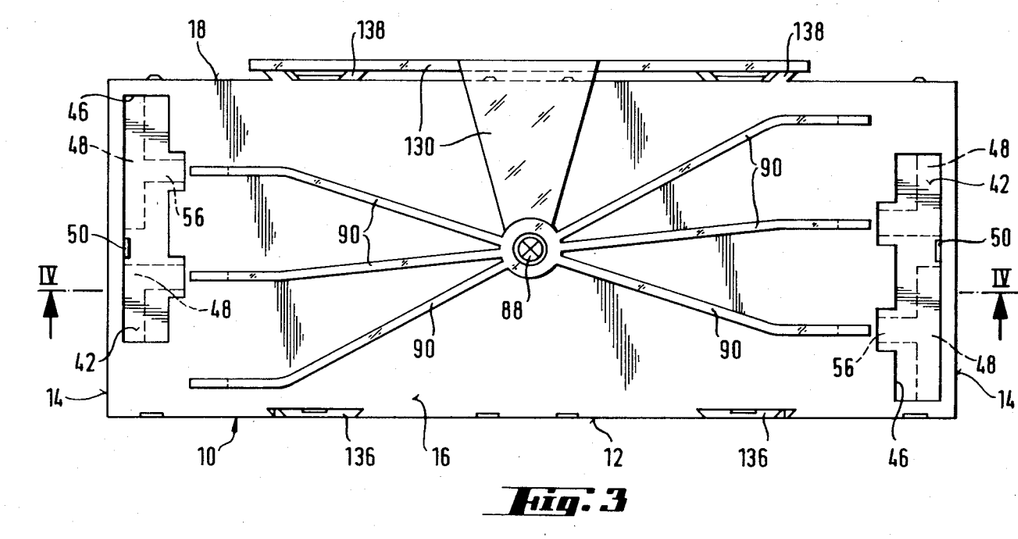
FIG. 3 is a rear view of the storage container.

As can be seen from FIGS. 2 and 3, a further light guide 130 may be guided onto the top wall 18 of the housing 12 and extend to shortly beyond the front of the housing 10. The light guide 130 has at its front edge a sloping portion 132 extending from its upper side to its underside, and the light, as a result of reflection at this sloping portion 132, is directed on the front region of the container. A light stop 134 against stray light, which may surround the container at least at the front, may be provided to cover the light guide 130 at the front and the top.

The housing 10 may be provided at the top and bottom with corresponding grooves 136 and springs 138 for joining together containers stacked one on top of the other.

Figures 11, 12, 13:
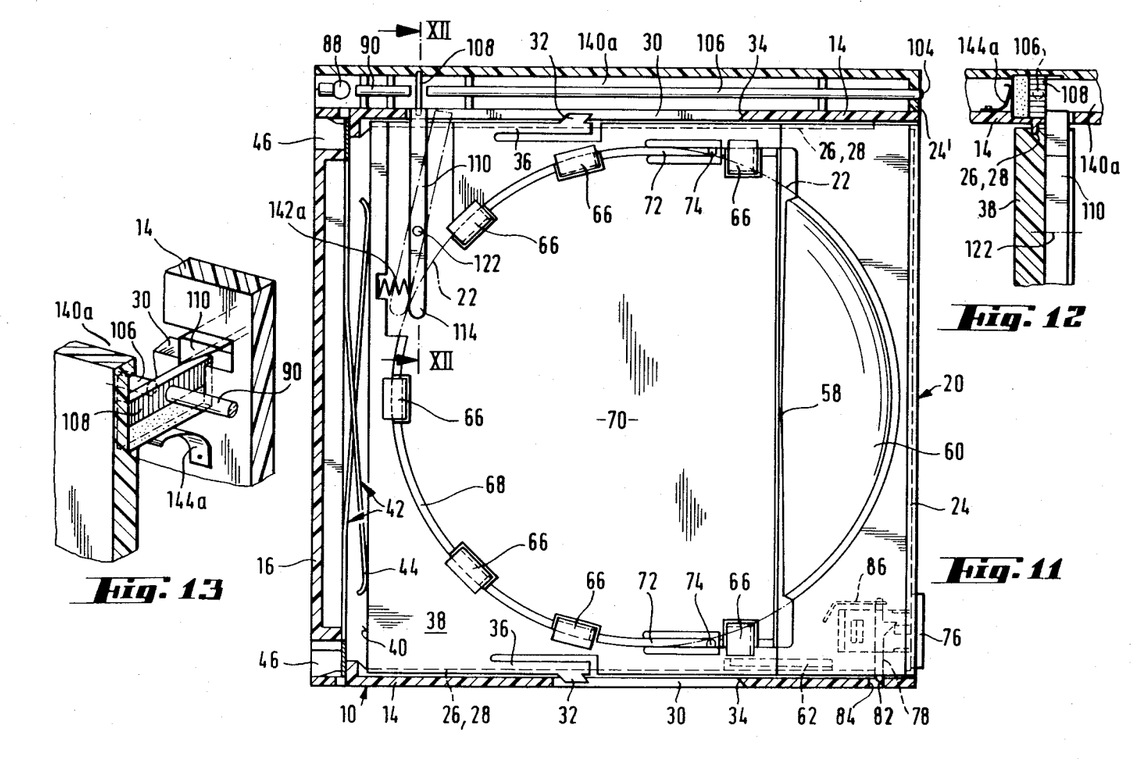
FIG. 11 shows a section corresponding to the section according to the line IV—IV of a further embodiment of a storage container for discs.
FIG. 12 shows a section along the line XII—XII of FIG. 11.
FIG. 13 shows a detail of the embodiment of FIG. 11.

In the embodiment shown in FIGS. 11 to 13, the housing 10 has lateral channels 140a associated with the respective holders 20. Light guides 90 extend from the light source 88 into the channels 140a. In the region of the receiving platter 38 inside the housing there is rotably mounted in its central region, adjacent to the corresponding channel 140a, the pivot lever 110, its free end 114 acting as button projecting under the action of a pressure spring 142a into the support region 68 of the disc 22. The other free end, which is approximately triangular in section, of the pivot lever 110, projects through an opening in the side wall 14 into the channel 140a and there engages with a signal flag 108 which is displaceably spring-biased towards the pivot lever 110 by means of a spring 144a. The light guide 90 terminates adjacent to one side of the signal flag 108 while the light guide 106 extends from the other side thereof into the window 104 at the front wall portion 24' of the housing 10. The signal flag 108 in the embodiment illustrated has two transparent portions of different color arranged one above the other. If a disc 22 is introduced and the holder 20 is pushed into the housing 10, the disc 22 presses against the button 114, as a result of which the pivot lever 110 releases the signal flag 108 so that it, under the action of the spring 114, is displaced so that a different color from that when the holder 20 is empty appears in the window 104.

Figure 14A:
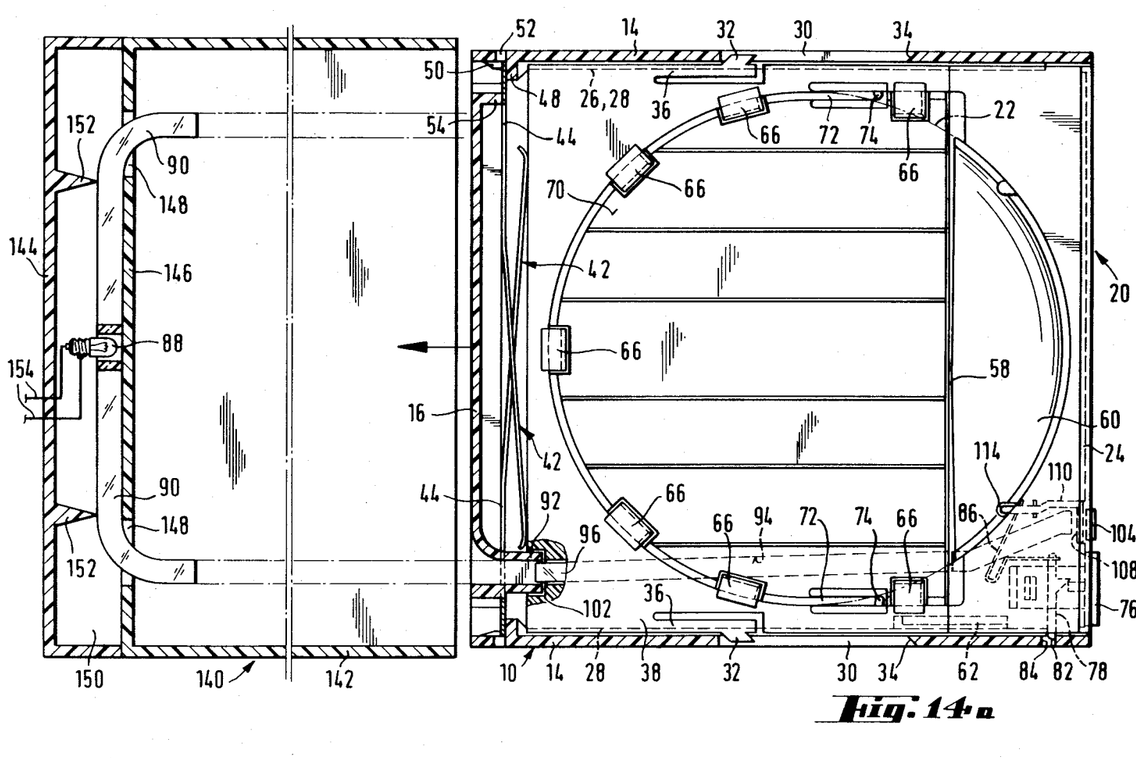
FIG. 14a and 14b show in section two embodiments of adapters for the storage container.

Accordingly to FIG. 14a, an adapter 140 is provided which comprises an essentially parallelepipedal housing 142 that is open at the front, into which the housing 10 fits and can be inserted. There is arranged spaced from the rear 144 of the housing 142 extending parallel thereto an intermediate wall 146, which defines the receiving area for the housing 10 and is provided with apertures 148 for the light guides 90 which are arranged in the intermediate space 150 between the rear wall 144 and the intermediate wall 146, the light guides bearing against the latter presssed by corresponding projections 152 on the inside of the rear wall 144. In this case the light guide 90 extend spider-like from the light source 88, which is also arranged in the intermediate space 150, as shown in the arrangement illustrated in FIG. 3, so that when the housing 10 is inserted into the adapter 140 the light guides 90 fit into the connection pieces 92 in the housing 10. Electrical supply lines 154 to the light source 88 lead from the intermediate space 150 outwards to the connection to the current source.

Figure 14B:
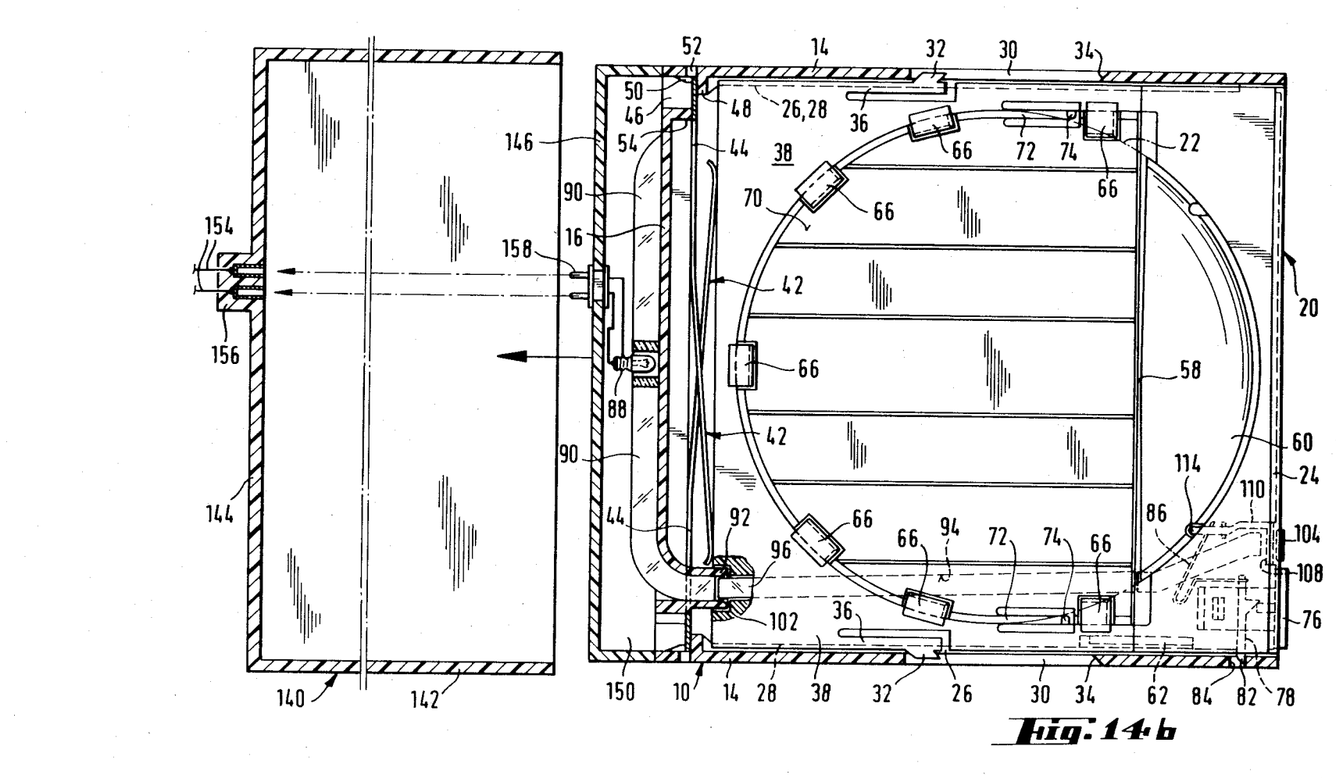

In the embodiment shown in FIG. 14b, the essentially parallelepipedal housing 142, open at the front, of the adapter 140 is provided at the rear wall 144 with a double plug socket 156, while the housing 10 has an additional rear wall 146 which is arranged parallel to the rear wall 16 and spaced therefrom and which, together with the rear wall 16, defines the intermediate space 150 accommodating the light guides 90 and the light source 88 and in which there are arranged two plugs 158 which, when the housing 10 is inserted into the adapter 140, engage with the double plug socket 156. Instead of this, however, it is also possible for the plugs 158 to be arranged on the rear wall 144 and for the double plug socket 156 to be arranged in the rear wall 146.

Figure 15:
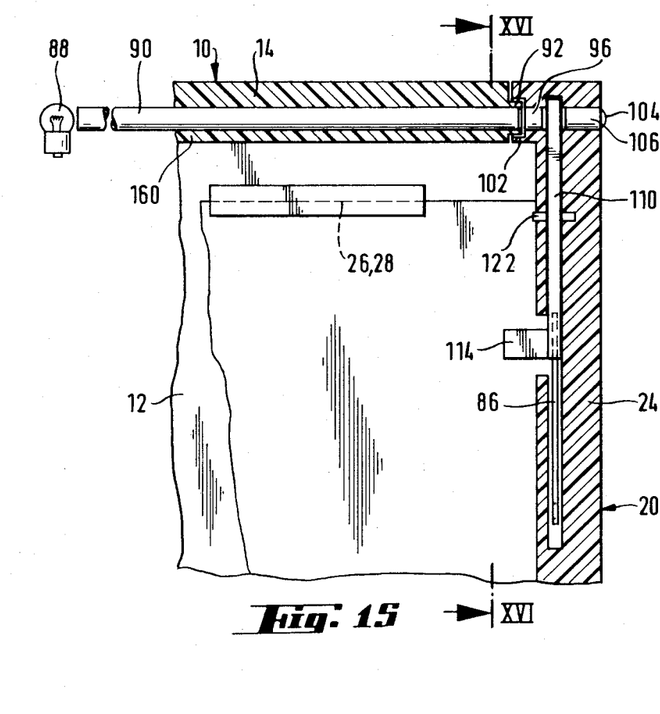
FIGS. 15 and 16 show cut away portions, in two sections that are at right angles to each other, of a storage container for magnetic tape cassettes.
Figure 16:
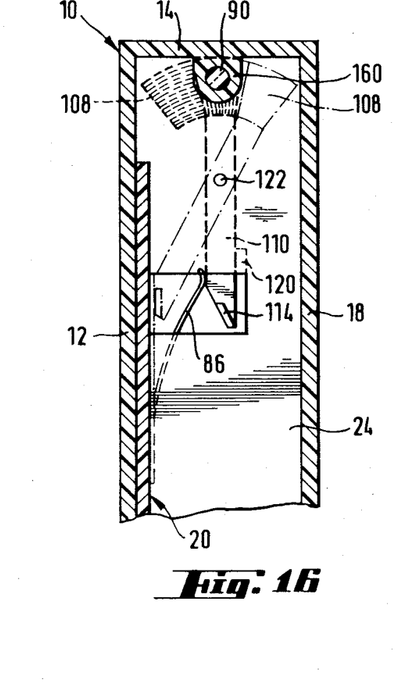

In the embodiment shown in FIGS. 15 and 16, a housing 10 is provided which accommodates a holder 20 for a magnetic tape cassette. The base 12 of the housing 10 has guide slots 26 for the holder 20, which extend over a predetermined distance and thus define the withdrawal travel of the holder 20 under the action of the ejector spring 42 after the locking arrangement has been released (neither shown here), so that the holder 20 can bring a magnetic tape cassette disposed therein into a removal position in which this can be grasped at the sides and easily removed. A side wall 14 of the housing 10 has an inwardly directed rib 160 which extends from the rear wall to the front edge of the housing 10 and has a bore which accommodates a light guide 90 which can be illuminated at the rear of the housing 10 by the light source 88. The light guide 90 terminates in a connection piece 92 shortly before the end thereof, while the front wall 24 of the holder 20 has a recess 102 engaging over the connection piece 82, from which a bore extends to the front side which accommodates two light guides 96 and 106 that are spaced from one another so that a signal flag 108 may be pivotally arranged between them. The bores in the rib 160 and in the front wall 24 are flush with one another so that light is transferred from the light source 88 to the indicator window 104 in which the light guide 106 discharges. The signal flag 108 has two portions of different color that are transparent and is secured to a pivot lever 110 which is rotatably mounted in the front wall 24 about pins 122, and of which the free end lying opposite the signal flag 108 carries a button 114. The pivot lever 110 is urged by a spring 86 against a stop 120 so that a portion of the signal flag 108 is arranged in the path of light between the two light guides 96, 106. By inserting a magnetic tape cassette, the button 114, which projects in to the receiving space of the holder 20 for the magnetic tape casette, is pressed down by the latter in the direction of the base of the holder 20, as a result of which the pivot lever 110 is pivoted about its pivot axis, which runs parallel to the direction of the light guide axis. The signal flag 108 is thus pivoted with its other colored portion between the light guides 96, 106 so that a different color from that when the holder 20 is not occupied appears in the indicator window 104 when the holder is pushed in, and light is transfered from the light source 88 by way of the light trap 92, 102 to the indicator window 104.

Figures 17, 18, 19, 20, 21:
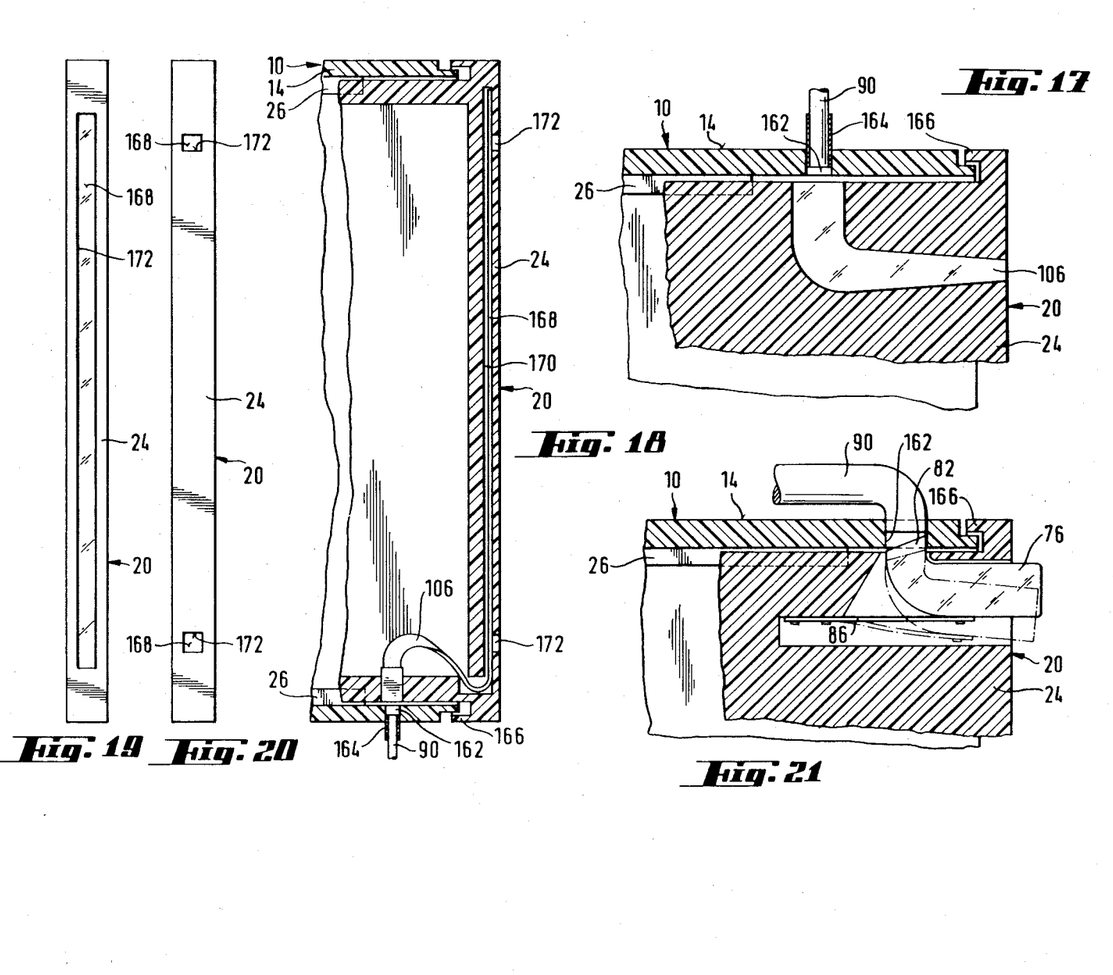
FIG. 17 shows schematically, in section, an embodiment with lateral light supply to the holder.
FIG. 18 to 20 show a further embodiment with lateral light supply to the holders.
FIG. 21 shows schematically, in section, an embodiment with illuminated button.

In the embodiment illustrated schematically in FIG. 17, the side wall 14 of the housing 10 has for each holder 20 an aperture 162, while the holder 20 accommodates a light guide 106 which discharges at the front and, at its other end, lies opposite the aperture 162 when the holder 20 is inserted into the housing 10. When the holder 20 is in the inserted position, light for illuminating the front wall of the container is supplied through the aperture 162 to the light guide 106, in the case illustrated by way of a light guide 90 provided with a mounting 164 at the end and inserted by this means into the aperture 162. In this case the holder 20 may advantageously cover the side wall 14 at the front and have an external rib 166 which, when the holder 20 is inserted, engages with a corresponding lateral external recess in the side wall 14 so that no stray light can emerge through the gap between housing 10 and holder 20. So as to have a degree of tolerance, the feed inlet of the light guide 106 is longer in the direction of insertion of the holder 20 than the aperture 162.

In the embodiment illustrated schematically in FIGS. 18 to 20, the light guide 106 is in the form of a web, which extends continuously in a light bank 168 in a slot 170 adjacent to and along the front wall 24, the rear of the slot 170 being designed as a reflector. The front wall 24 has either windows 172, for example in the region of the side ends (FIG. 20), or a continuous window 172 for the emergence of light for illuminating the front wall of the container (FIG. 19), the light band 168 causing light to emerge in the region of the windows 172.

In the embodiment illustrated in FIG. 21, the button 76 consists of transparent material and is biased towards the side wall 14 by means of a leaf-type return spring 86, which is fixed to the holder 20 and to the button 76. The button 76 carries the locking projection 82, which is integrally formed therewith and projects into the aperture 162, which here is a catch. In this manner, light is guided from the light guide 90 by way of the button 76 to the front of the container.

Figure 22:
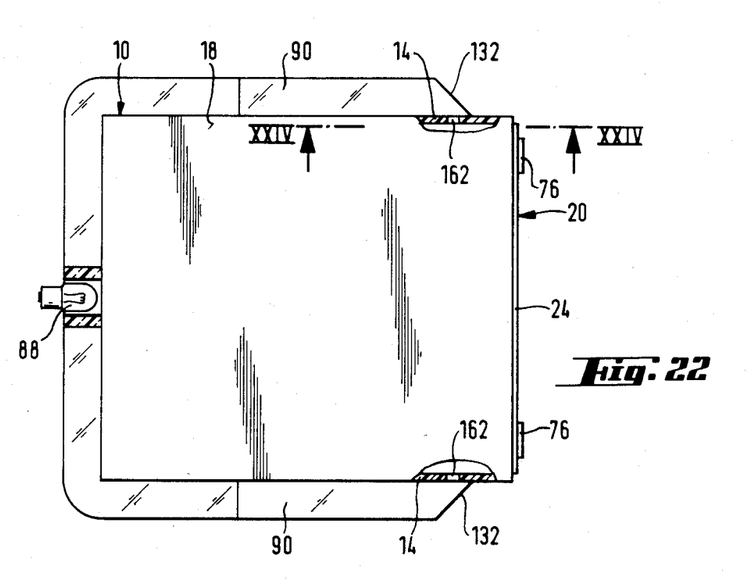
FIGS. 22 to 24 show schematically an embodiment of the lateral inlet of light.
Figure 23:
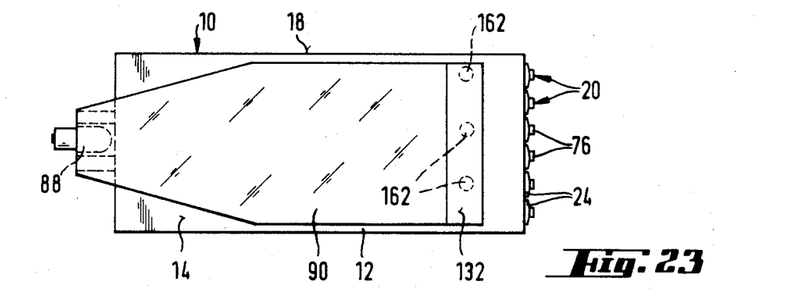
Figure 24:
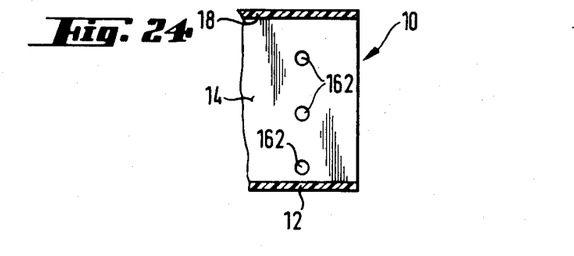

As can be seen from FIG. 22, light guides 90 may extend, engaging around the container, from the rear of the container to the individual apertures 162, there being provided in the region of the apertures 162 for forming a reflecting surface, sloping portions 132 that reflect the light through the apertures 162 into the interior of the container. In this case, individual light guides 90 may each extend to an aperture 162, or these light guides 90 may all be combined on one side of the container to form a single light guide, as can be seen in FIG. 23.

Figure 25:
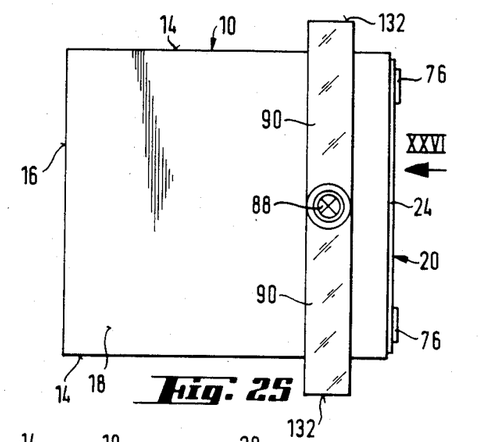
FIGS. 25 and 26 show schematically a further embodiment of the lateral light supply.
Figure 26:
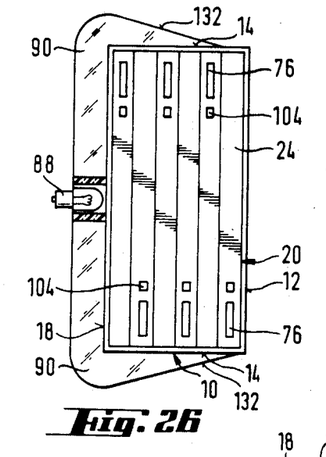

According to FIGS. 25 and 26, in each case one light guide 90 may extend from the top of the container as far as over the area of the apertures 162 on its sides, the sloping portion 132 extending over the entire area of the apertures 162 so that light is guided from one light guide 90 through all apertures 162 of one side of the container into the interior thereof (to be guided from there to the front). The light source 88 may be arranged on the upper side of the container.

Figure 27:
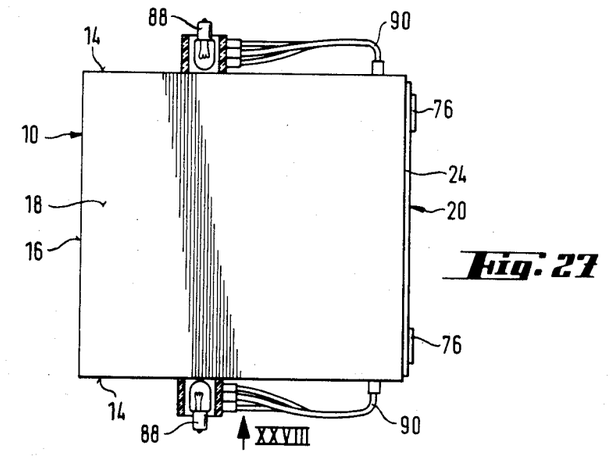
FIGS. 27 and 28 show schematically an additional possibility of lateral light supply.
Figure 28:
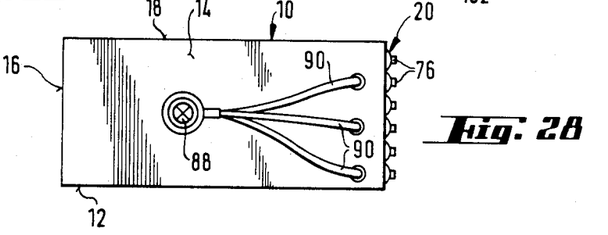

According to FIGS. 27 and 28, one light source 88 is arranged on each of the two sides of the container and from these there emerge flexible light guides 90 which terminate in the apertures 162.

The sloping portios 132 may be mirror-coated.

There come into consideration as light guides, for example, fibre optic light guides, but the light guides are especially in the form of injection-molded parts, especially, for example, the light guide spider.

I claim:

1. Storage container for recording media for installation in a motor vehicle having an electrical system, comprising:
    a housing;
    a plurality of holders received in the housing, each holder defining a storage chamber for respective recording media, and having a front wall for covering the storage chamber and means for transporting the media out of the housing into position to be removed therefrom;
    means carried by the container exterior to the housing for supplying electricity to the housing from the vehicle electrical system;
    means electrically connected to said means for supplying electricity, for generating light outside the holders;
    a plurality of feed outlets carried by the housing for transmitting light from the means for generating light to each holder;
    at least one feed inlet carried by each holder and arranged such that said feed inlet is in light transmitting contact with one of said feed outlets when the holder is fully inserted in the housing; and
    means associated with the front wall of each holder and with said at least one feed inlet, for illuminating at least a portion of the front wall when generated light is transmitted through said feed inlet.

2. Storage container according to claim 1, wherein the means for generating light comprises a light source provided for more than one holder, from which light guides lead to the feed inlets of the holders.

3. Storage container according to claim 2, wherein the means for generating light is outside the housing.

4. Storage container according to claim 3, wherein the light guides are introduced into the housing.

5. Storage container according to claim 3, wherein the light guides are guided around the housing to apertures, each of which is adjacent to a feed inlet for a holder.

6. Storage container according to claim 5, wherein the light guides have sloping portions reflecting into the intereior of the housing.

7. Storage container according to claim 3 wherein the light guides form a light guide spider, which spreads out from the means for generating light such that one light guide arm is provided for each holder.

8. Storage container according to claim 7, wherein the arms are offset in height and/or laterally.

9. Storage container according to claim 7 wherein the light guide spider is an injection-moulded part.

10. Storage container according to claim 7 wherein several arms are combined and lead to feed inlets of several holders.

11. Storage container according to claim 2 wherein the means for generating light include a light source at each side of the housing.

12. Storage container according to claim 2, characterised in that the means for generating light is a light source on the rear of the housing.

13. Storage container according to claim 12, wherein the light guides enter into the housing through the rear wall thereof.

14. Storage container according to claim 2, further including means for suppressing stray light flowing into or out of the light guide and feed inlets.

15. Storage container according to claim 14, wherein at least some of the means for suppressing stray light include sleeves that can be moved one into the other, in which the light guides discharge, located between the housing and the holders.

16. Storage container according to claim 14, wherein the front walls of the holders and the side walls of the housing have projections that overlap at the front.

17. Storage container according to claim 2 wherein the light guides have broad outlet ends from which an essentially point-like removal of light is effected through the feed inlets, or vice versa.

18. Storage container according to claim 1 wherein each holder has a button and an associated locking means for engaging the housing, and the means for illuminating directs light to the button.

19. Storage container according to claim 18, wherein the light is fed directly into the button.

20. Storage container according to claim 1 wherein the means for illuminating include a light band arranged adjacent and parallel to the front wall of the holder, the front wall including at least one window through which light from said light band can be transmitted.

21. Storage container according to claim 1 further including an adapter which carries the means for supplying electricity, the adapter being sized to receive at least a portion of said housing.

22. Storage container according to claim 21, wherein plug contacts and associated sockets are provided between the housing and the adapter.

23. Storage container according to claim 22, further including an intermediate wall between the rear wall of the adapter and the rear wall of the housing for defining a chamber for accommodating the means for generating light, the intermediate wall extending parallel to and spaced from the rear wall of the housing, the light guides coming from the means for generating light passing through the intermediate wall into the chamber.

24. Storage container according to claim 23, wherein the intermediate wall is arranged in the adapter.

25. Storage container according to claim 23, wherein the intermediate wall is arranged in the housing.

26. Storage container according to claim 1 further including container illuminating means for directing a dim radiation onto the front of the container.

27. Storage container according to claim 26, wherein the container illuminating means includes a light guide extending from the means for generating light to the front of the container.

28. Storage container according to claim 2, wherein a covered light guide extends through the holder to the region of the front wall thereof.

29. Storage container according to claim 1, further including an indicating window on each holder, visible from the outside, and switch-over means associated with the window operable by the removal or insertion of a recording medium into a holder for optically indicating whether the holder is occupied.

30. Storage container according to claim 29, wherein the switch-over means effects a color change visible in the window.

31. Storage container according to claim 29, wherein the optical indication is switched on and off by the switch-over means.

32. Storage container according to claim 29, wherein the switch-over means includes light modulating means.

33. Storage container according to claim 32, wherein the light modulating means has two transparent zones, of which at least one is colored.

34. Storage container according to claim 33, wherein the two zones are arranged adjacent to each other transverse to the direction of light flow and can be brought alternately, in accordance with the presence or absence of the recording medium, into the light path to the indicator window.

35. Storage container according to claim 33, wherein the two zones are arranged one behind the other in the direction of light flow, and at least one zone can be brought into the path of light by inserting a recording medium into the holder.

36. Storage container according to claim 32, wherein the modulating means comprise a light stop that can be brought into the path of light to the indicator window.

37. Storage container according to claim 36, wherein the recording medium acts as a light stop interposed in a light path, the light path extending from the means for generating light to the indicator window and passing through the area of the holder adapted to receive the recording medium.

38. Storage container according to claim 29 wherein the switch over means includes a tang located in the area of the holder adapted to receive the recording medium.

39. Storage container according to claim 29, wherein the housing includes tangs that project into the receiving areas for the recording media on the holders.

40. Storage container according to claim 29, wherein the switch-over means is arranged in the holder.

41. Storage container according to claim 32, wherein the modulating means is pivotable between said feed inlet and said means for illuminating the front wall.

42. Storage container according to claim 29, wherein the switch-over means comprise a pivot lever which is spring-biased into a first end position.

43. Storage container according to claim 42, wherein the pivot lever has a tolerance-compensating bearing.

44. Storage container according to claim 43, wherein the bearing has open bearing shells, and a stop is operatively associated with the lever to define a second end position, which is reached only after a partial pivotal movement of the lever.

45. Storage container according to claim 29, wherein each holder has an operating button located adjacent to the indicator window for bringing the holder into the removal position for the recording medium.

46. Storage container according to claim 2, wherein the holder has a base portion and a flap portion hinged to the front of the base portion, and wherein each portion includes a light guide which are coupled at the end faces when the portions are flush.

47. Storage container according to claim 29, wherein the switch-over means have an actuating member in the region of the holder which is inside the housing, such that the actuating member can be displaced by the pressure of an adjacent end edge of the inserted recording medium.

48. Storage container according to claim 2, wherein the light guides are fiber-optic light guides.

49. Storage container according to claim 1, wherein the housing itself includes the means for supplying electricity from the motor vehicle electrical system.

* * * * *